United States Patent [19]
Fowler

[11] 3,876,544
[45] Apr. 8, 1975

[54] ELECTROGALVANIC FILTER CELL
[75] Inventor: Leslie L. Fowler, Tulsa, Okla.
[73] Assignee: Cata-Sep Corporation, Tulsa, Okla.
[22] Filed: Oct. 23, 1973
[21] Appl. No.: 408,673

Related U.S. Application Data
[63] Continuation-in-part of Ser. No. 202,487, Nov. 26, 1971, Pat. No. 3,800,945.

[52] U.S. Cl. ............. 210/198 R; 210/489; 210/505; 210/DIG. 5
[51] Int. Cl. ............................................. B01d 35/06
[58] Field of Search ........ 210/222, 192, 198 R, 484, 210/485, 489–491, 497.1, 499, 502–512, DIG. 5

[56]                References Cited
              UNITED STATES PATENTS
| | | | |
|---|---|---|---|
| 1,845,316 | 2/1932 | Michailousan | 210/192 X |
| 2,164,142 | 6/1939 | Moore | 210/490 |
| 2,395,301 | 2/1946 | Sloan | 210/505 X |
| 2,405,838 | 8/1946 | Lawson et al. | 210/DIG. 5 |
| 3,016,345 | 1/1962 | Price | 210/DIG. 5 |
| 3,231,091 | 1/1966 | Kingsbohn et al. | 210/DIG. 5 |

*Primary Examiner*—John Adee

[57] ABSTRACT

A filter cell for coalescing oil droplets dispersed in a water emulsion, including a perforated tubular core into which the emulsion is injected. A layer of emulsion breaking fibrous metallic material wound about the core through which the emulsion passes. The first metal of which the tubular core is made is different from the metal comprising the fibrous material. The two different metals are selected on the basis of their electrogalvanic potential, such that when the mixture of water and oil droplets passes through the filter, as an electrolyte, there will be developed between the core and the fibrous material an electrical potential which will aid in the separation of the oil into droplets, and coalescing the oil, to provide an improved separation of the oil and water. The outer surface of the core may be coated with an insulating paint or other insulating layer so as to prevent the shorting of the potential generated in the electrolyte between the two dissimilar metals. Additional perforated metallic cylindrical shells and wrappings of fibrous metal can be provided to make a multilayered filter cell, each of the layers comprising a selected pair of metals so as to generate the electrogalvanic potential.

11 Claims, 2 Drawing Figures

ELECTROGALVANIC FILTER CELL

CROSS REFERENCE TO RELATED APPLICATION

This application is a continuation-in-part of the copending application Ser. No. 202,487 now U.S. Pat. No. 3,800,945, entitled "CELL HAVING CATALYTIC ACTION FOR COALESCING OIL DROPLETS." This copending application was filed Nov. 26, 1971, and is made a part of this application by reference.

BACKGROUND OF THE INVENTION

This invention lies in the field of the filtering of mixtures of dissimilar liquids. More particularly, it concerns the breaking of oil and water emulsions in which small droplets of oil are present in larger quantities of water.

This problem of the breaking of oil and water emulsions is a very common one, particularly in the oil production industry. Various methods have been devised for handling this problem. Some of these are chemical, some are thermal, some are gravity operated separations, or combinations of these. Another method is to provide a filtering action such that the emulsion mixture is passed through a permeable layer of material, with or without catalytic particles to aid the separation.

SUMMARY OF THE INVENTION

It is a primary object of this invention to provide a filter cell which will have an improved action in the separation of oil droplets from an oil and water emulsion. More particularly this filter cell will provide mechanical, catalytic, and electrolytic separation of the oil and water.

These and other objects are realized and the limitations of the prior art are overcome in this invention by using a filter cell which is comprised of a central tubular perforated core of metal, about which is wrapped at least one layer or fibrous batt of metal fibers. As indicated in the copending application, there can be added to the fibrous material, solid particles of catalysts, which aid in the separation of the oil and water and the breaking of the emulsion. However, the new principle of this invention lies in the use of two or more metals, one for the core and one for the fibrous batt which have different electrogalvanic potentials. Therefore, when the water oil emulsion is introduced as an electrolyte, there will be generated an electrogalvanic potential difference between the two metals, which will help to release the oil from combination in the water. This action will be facilitated if the outer surface of the core is insulated from the batt which is wrapped around it and this can be accomplished by the use of appropriate paints or perforated plastic sheets, etc.

There can be plural layers of perforated cylindrical shells, and wound batts of fibrous metal, each of a selected metal having a known electrogalvanic potential.

BRIEF DESCRIPTION OF THE DRAWINGS

These and other objects of this invention and a better understanding of the principles and details of the invention will be evident from the following description, taken in conjunction with the appended drawings, in which.

DESCRIPTION OF THE PREFERRED EMBODIMENT

Figures 1, 2:
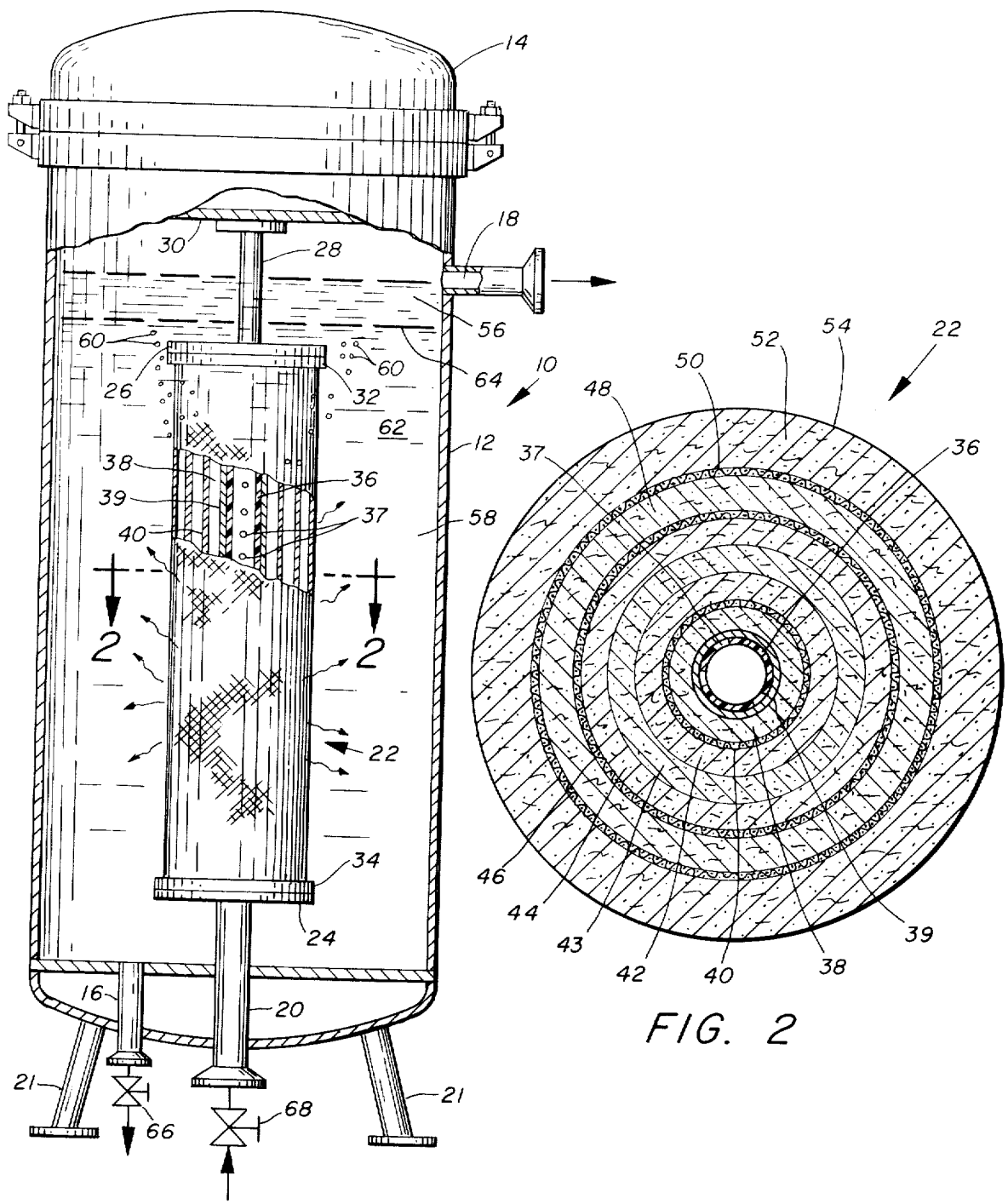
FIG. 1 represents a cross-section through a tank in which is installed a filter cell of the type of this invention.
FIG. 2 illustrates in a horizontal cross-section the internal construction of the filter cell.

Referring to the drawings, an oil-water separator is generally indicated by the numeral 10. The separator includes a vessel 12, having a removable top 14, water outlet 16 in the bottom thereof and oil outlet 18 in the side wall adjacent top 14. The vessel 12 is supported on legs 21. The liquid mixture or emulsion is introduced into the vessel through inlet 20. Positioned within the vessel is a cell generally indicated by numeral 22 which performs the function of coalescing oil droplets entrained in the emulsion introduced through inlet 20, to effect the separation of the liquids.

The upper end of inlet 20 is provided with a plate 24. An opposed upper plate 26 is affixed to the lower end of the downwardly extending rod 28 affixed to the interior of the vessel such as to a horizontal bar 30 extending across the top portion. Thus the filter cell 22 is positioned between plates 24 and 26 in a manner to receive the flow of the emulsion or liquid mixture from inlet 20. As shown in FIG. 1, the cell 22 includes an upper end cap 32 which sealably engages plate 26 and a lower end cap 34 which engages the lower plate 24.

The specific arrangement for supporting the filter cell 20 in vessel 10 is illustrated as an example only and is not a part of this invention. Many means are known for supporting filter cartridges and the like in vessels in a removable and leakproof arrangement, all of which may be utilized in practicing this invention. The essence of the invention is the construction and method of operation of filter cell 22.

Referring to FIG. 2, which is a cross-sectional view of cell 22, the construction of the filter cell is best illustrated. The filter cell includes an elongated perforated core tube 36. By means of an opening in lower end cap 34, the interior of tube 36 communicates with the interior of inlet 20 so that emulsion injected into inlet 20 flows into the interior of core tube 36 and out through the perforation 37 therein. Wound around core 36 is a plurality of layers of fibrous metallic material which have the capability of achieving the coalescence of dispersed oil droplets. The layers may vary as to composition, porosity, density, thickness and so forth.

The metal of which is constructed the core tube 36 and the metal of which the fibrous material is constructed are dissimilar metals, which are chosen because of their electrogalvanic potential. The purpose of this difference in metals is to create an electrogalvanic cell, when the emulsion is introduced into the interstices of the filter cell. There will be a galvanic potential generated between the core tube and the fibrous metallic material which will serve to enhance the coalescence of the oil droplets to form larger droplets which will consequently rise to the surface and be collected.

There is a further benefit of making the construction entirely of metal, in that the filter cell can be cleaned by using steam flowing through the core tube and through the surrounding fibrous metal layers. However, the principal effect of this invention lies in the use of different metals for the purpose of generating the galvanic potential. To this end, it may be desirable to insulate the outer surface of the core tube 36. This is indicated in FIG. 2 by the thin layer 39 which can be of any suitable insulating material such as high temperature paint or sheets of perforated plastic material.

It is also possible as indicated in the copending application Ser. No. 202,487 now U.S. Pat. No. 3,800,945, to use such fibrous materials as polyester fibers, acrylic fibers, mold acrylic fibers, fiberglass, etc. While these may not be able to stand such high temperatures as the metals, they have a particular affinity for the oil and can assist in the coalescing operation.

It is possible also to impregnate the batts of fibrous material whether they be of metallic or nonmetallic fibers, with a plurality of small particles of catalyst material which can be attached to the fibers. Similarly, a plurality of small particles of metal of the same desired electrogalvanic potential can be impregnated upon the insulating fibers listed above, so that these particles will form centers of potential which will aid in the coalescing of the oil.

As further shown in FIG. 2, in addition to the core tube 36 and a first layer of fibrous material 38 there can be an additional perforated sheet or screen or wire mesh 40 wrapped around the layer 38. There can be then additional layers of fibrous material of different compositions, densities, permeabilities, etc., such as 42, 43 and 44, and so on.

In FIG. 1 there is shown in partial section the core tube 36 and a plurality of perforations 37 through which the emulsion entered through pipe 20 is passed outwardly through the one or more layers of fibrous material, whether made of metal or nonmetal. These serve to coalesce the tiny drops of oil into larger drops which have sufficient gravity forces to permit them to rise through the emulsions as shown by drops 60 which rise to the surface forming a layer of oil 56 on top of the water 62 and having an interface 64.

There is a valve 66 on the output pipe 16 and a corresponding valve 68 on the input pipe 20 by means of which to control the flow of emulsion in and water out such as to maintain the water oil interface 64 at some point below the level of the outlet pipe 18 so that there will be substantially clean oil in the region 56 from which it flows outwardly through the pipe 18. As is well known in the art, it is possible to install in the tank 12 a level control sensitive to the position of the interface 64 by means of which the outlet flow valve 66 can be controlled so as to maintain the water oil interface at some point below the level of pipe 18 to facilitate the separation.

As to the types of metal that may be used in the construction of this filter cell, there can be a steel pipe 36 with a layer of aluminum fibers or conversely an aluminum pipe with steel fibers or steel or aluminum with copper wool and so on, such as to provide a preferred and enhanced separation of the oil and water.

It will be clear also that the intermediate metal shells such as 38 should be coated with plastic material both inside and outside if the corresponding layers of fibers are of metallic construction. On the other hand if the fibers are of nonmetallic construction, such as the various types of plastic materials, such as polyester fibers, acrylic fibers, etc. insulation of the core and shells is not required. When the nonmetallic fibers are used they can be impregnated with small particles of a selected metal. In this case no additional insulation of the screens or shells is required.

Various types of catalytic material particles are discussed in the copending application Ser. No. 202,487 now U.S. Pat. No. 3,800,945, which is made a part of this application by reference.

Summarizing, this filter cell can be made up of metal tubes and shells with intervening layers of metal fibers, each of a selected metal. There can be a single layer surrounding a single core tube or there can be a plurality of successive layers and shells, and so on. It is possible also to use metallic core tube and shells, where nonmetallic fibrous material is used, which are impregnated with particles of metallic materials and/or with catalytic material.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A filter cell for coalescing oil droplets dispersed in a water emulsion, comprising:
   a. an elongated perforated tube core of a first selected metal into which said emulsion is injected;
   b. at least one layer of emulsion breaking fibrous material containing a second selected metal, wound around said core, through which said emulsion is forced to pass;
   c. said first and second selected metals of first and second different electrogalvanic potential, respectively;
      whereby when said liquid mixture flows through said core and said material, there will be formed an electrogalvanic couple having a difference in potential, which serves to aid the coalescing of said oil droplets.

2. The filter cell as in claim 1 in which said fibrous material is metallic.

3. The filter cell as in claim 1 in which said fibrous material is a plastic material impregnated with metallic particles.

4. The filter cell as in claim 2 including means to insulate said core from said material.

5. The filter cell as in claim 4 in which said means to insulate comprises an insulating coating applied to the outer surface of said core.

6. The filter cell as in claim 2 including at least a second cylindrical shell of perforated metal surrounding said layer of fibrous material of said second metal, said second shell of a third selected metal of different electrogalvanic potential.

7. The filter cell as in claim 6 including insulating means of the inner surface of said second cylindrical shell.

8. The filter cell as in claim 7 including a second layer of fibrous fourth selected metal wound around said second cylindrical shell, said third and fourth metals of different electrogalvanic potential.

9. The filter cell as in claim 8 including insulating means on the outside surface of said second cylindrical shell.

10. The filter cell as in claim 1 including particles of catalytic material impregnated into said fibrous material.

11. The filter cell as in claim 1 in which said fibrous material is nonmetallic and including particles of selected metals impregnated into said fibrous material.

* * * * *